United States Patent [19]

Grebe

[11] 4,366,663
[45] Jan. 4, 1983

[54] PACKAGING DEVICE

[75] Inventor: Reiner Grebe, Biedenkopf, Fed. Rep. of Germany

[73] Assignee: Kraemer & Grebe GmbH & Co. KG Maschinen- und Modellfabrik, Wallau, Fed. Rep. of Germany

[21] Appl. No.: 171,582

[22] Filed: Jul. 23, 1980

[30] Foreign Application Priority Data

Jul. 31, 1979 [DE] Fed. Rep. of Germany ....... 2930963

[51] Int. Cl.³ .................... B65B 47/10; B65B 47/02
[52] U.S. Cl. ..................................... 53/559; 53/560; 53/561; 425/121; 425/123; 425/122
[58] Field of Search ............... 53/559, 560, 561, 555, 53/389; 242/76; 226/196, 198, 199; 425/122, 121, 123

[56] References Cited

U.S. PATENT DOCUMENTS

| Re. 27,881 | 1/1974 | Brown et al. | 226/173 X |
|---|---|---|---|
| 2,902,808 | 9/1959 | Lang | 53/560 |
| 3,073,499 | 1/1963 | Middleton, Jr. et al. | 226/173 X |
| 3,193,881 | 7/1965 | Kostur | 226/173 X |
| 3,246,816 | 4/1966 | Dexter et al. | 226/173 X |
| 3,653,175 | 4/1972 | Rogiers | 53/559 |
| 3,673,760 | 7/1972 | Canamero et al. | 226/173 X |
| 3,938,298 | 2/1976 | Luhman et al. | 53/555 X |

Primary Examiner—Horace M. Culver
Attorney, Agent, or Firm—Blanchard, Flynn, Thiel, Boutell & Tanis

[57] ABSTRACT

A packaging device for sealingly closing an upper foil and a lower foil utilizing a framelike constructed welding device which has a separate drive for welding together the lower and the upper foil, of which at least the lower foil is formed into containerlike segments and is moved, held by a chain at the sides thereof, through the packaging device. The packaging device has an evacuating chamber which is formed of two boxlike halves, of which one half is stationary and the other half is vertically movable. One of the halves has a framelike welding device embodied therein.

5 Claims, 5 Drawing Figures

PACKAGING DEVICE

FIELD OF THE INVENTION

This invention relates to a packaging device and, more particularly, relates to a guide structure for supporting the foil as it moves through the packaging device.

BACKGROUND OF THE INVENTION

Packaging devices of the abovementioned type, which are a part of a packaging machine and which as a rule have a deep-drawing station for forming containerlike segments in a lower foil and a cutting device for separating the segments into individual packages, are suitable only for the manufacture of packages wherein only the lower foil is formed into containerlike segments. The reason for this is that even if the upper foil is formed into containerlike segments, both halves of the evacuating chamber must be movably constructed, so that the goods or material to be packaged which projects above the upper edge of the lower container can be moved into the packaging device and the finished package can be removed from the packaging device. However, the vacuum chambers are relatively heavy, especially since a vacuum half must also yet have the welding frame mounted thereon. The movable design of both vacuum chamber halves would thus considerably complicate the packaging machine and thus make it more expensive.

The basic purpose of the invention is to provide a packaging device of the abovementioned type so that also in the case of only one movable vacuum chamber half, same is suited for the manufacture of packages in which both the lower and also the upper foil are formed into containerlike segments.

This purpose is inventively attained by providing a chain which moves the lower foil and arranging it so that it is vertically elevatable at least in the area of the packaging device relative to a stationarily arranged half of the evacuating chamber. The chain which moves the lower foil has a substantially lower weight than the evacuating chamber and is in addition sufficiently flexible, so that same with the help of suitable devices, for example hydraulic cylinders, can be lowered or raised in the region of the evacuating chamber, depending on whether the lower or the upper half of the evacuating chamber is movably constructed. As the only additional measure, it is necessary to slightly increase the path, over which the movable evacuating chamber must be raised or lowered. The invention permits to manufacture individual packages at little expense, in which both the upper and also the lower foil are formed into containerlike segments.

The chain is preferably held in guides for purposes of facilitating a transporting of the lower foil. These guides can be constructed in two or more parts in the region of the packaging device and are connected hingedly to one another. Devices for effecting a lifting and lowering of the guides engage these guides, which for example can comprise pneumatic or hydraulic cylinders.

BRIEF DESCRIPTION OF THE DRAWINGS

Exemplary embodiments of the invention will be described in greater detail hereinbelow with reference to the drawings, in which.

DETAILED DESCRIPTION

Figure 1:
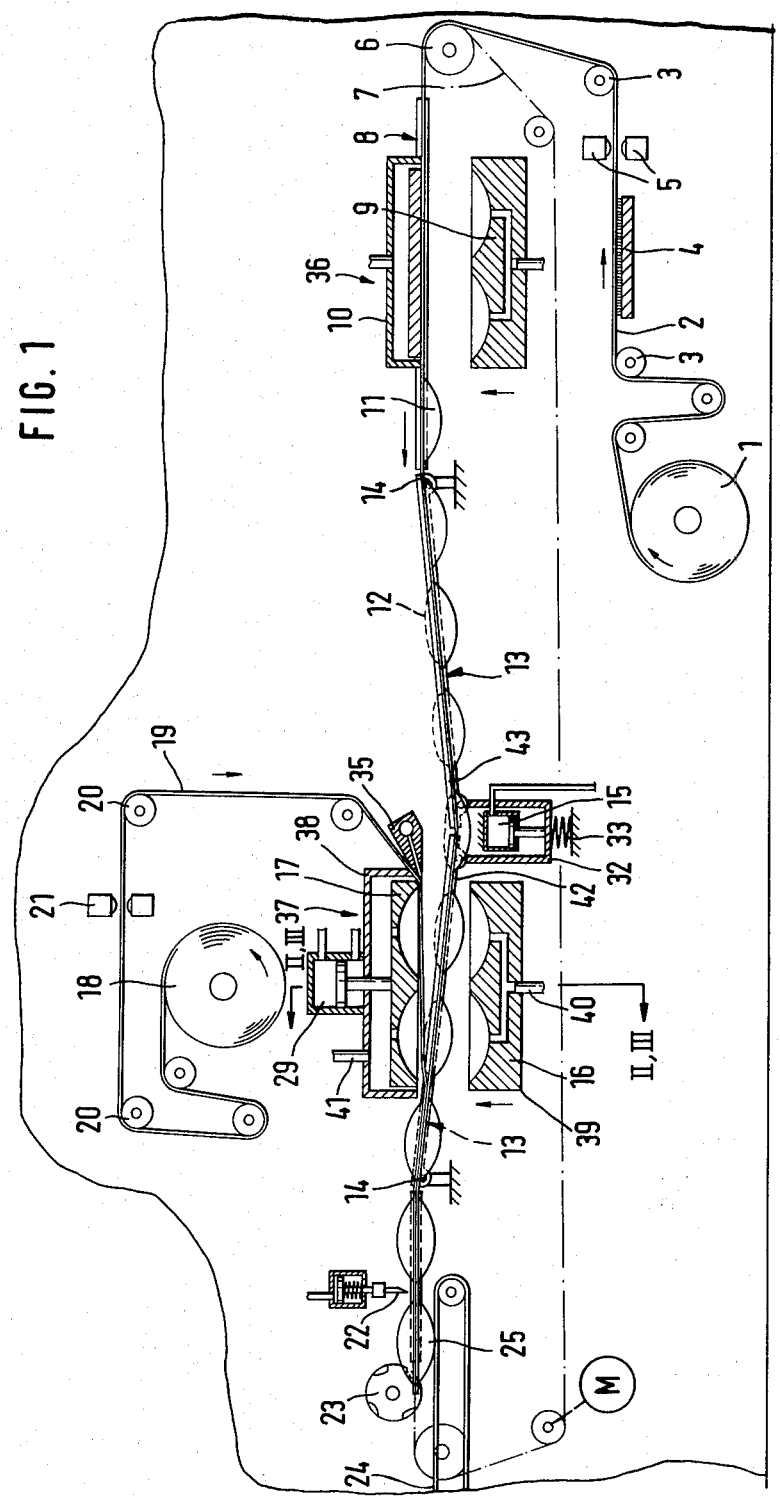
FIG. 1 is a partially sectioned side view of a packaging machine having an inventively constructed packaging device.

FIG. 1 illustrates a longitudinal cross-sectional view of a packaging machine having an inventive packaging device embodied therein. The packaging machine consists of an unwinding device 1 for a lower foil 2, which is guided over rollers 3 and subsequently over a heating plate 4 provided for heating up the lower foil. Pressure-mark control heads 5 are provided after the heating plate 4 and are aligned with the lower foil. The pressure-mark control heads are needed when the lower foil is imprinted and is to be placed in a packaging device 37 (to be discussed below) coinciding with an upper foil 19. The heating plate 4 heats thereby the lower foil so that same can be stretched in the region in which it is not yet engaged and guided and transported by foil-transport chains to compensate for tolerance variations. The lower foil is then engaged following the pressure-mark control heads in a conventional manner and on both sides by endless foil-transport chains 7. The chains are driven by a motor M in a conventional and, therefore, schematically illustrated manner.

The endless foil-transport chains 7 are guided in chain guides 8 and 13, the parts 13 of which are vertically elevatable. A deep-drawing station 36, which has a lower deep-drawing mold part 9 and a deep-drawing mold bridge 10, serves to form the lower foil 2 into plural containerlike segments 11. The lower foil 2 now in the form of a container 11 then travels into the packaging device 37. In the packaging device 37, the containerlike formed lower foil, which in the meantime has been filled with a material 12 to be packaged, is welded to the upper foil 19, which upper foil is during the same operation formed into a containerlike shape. The packaging device is thereafter guided to a transverse-cutting device 22 and a longitudinally extending cutting knife 23, which separates the plural containerlike segments into individual packages. Such packages are thereafter carried away by a removing belt 24.

The upper foil 19, which as a rule has printing thereon, is fed by an upper foil unwinding device 18 over guide rollers 20 to the packaging device 37. A pressure-mark control head 21 is mounted between the upper foil unwinding device 18 and the packaging device 37, with the help of which control head 21 and with the pressure-mark control head 5 the lower and upper foils are correctly aligned in the packaging device.

Figure 2:
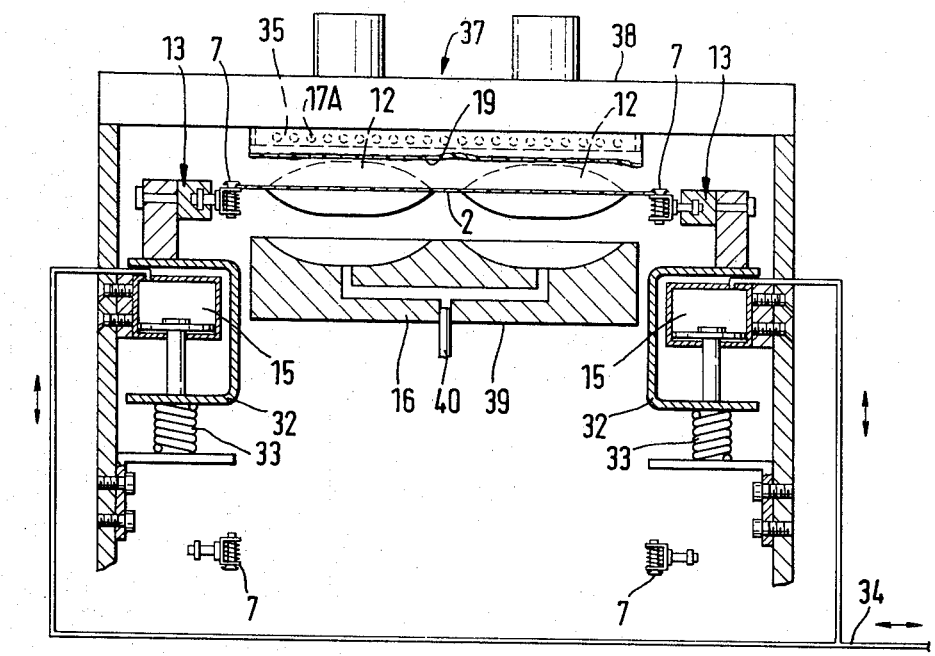
FIG. 2 is a cross-sectional view taken along the line II—II of FIG. 1 showing the inventive packaging device in the opened condition and with the chain guide mechanism in the lowered condition.
Figure 3:
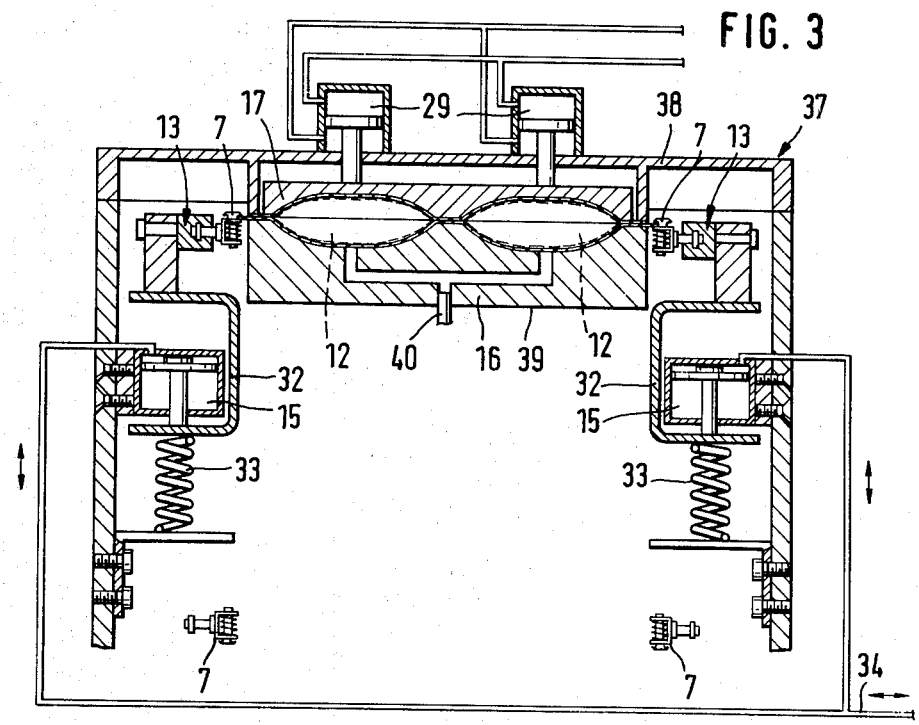
FIG. 3 is a cross-sectional view taken along the same sectional line as FIG. 2, however, illustrating the packaging device in the closed condition with the chain guide mechanism in the raised condition.

FIGS. 2 and 3 illustrate a longitudinal cross-sectional view of the packaging device 37 shown in FIG. 1 in an open and in a closed condition, respectively. The packaging device 37 consists of two evacuating chambers 38 and 39. The evacuating chamber 39 also simultaneously serves as the hot-sealing lower mold part. A hot-sealing upper mold part 17 is movably arranged in the vertical direction in the upper evacuating chamber 38 and has plural heater elements 17A embodied therein. For this two compressed-air cylinders 29 are mounted on the chamber 38, the piston rods of which engage the hot-sealing upper mold part. An under-pressure connection 40 is provided in a conventional manner in the lower vacuum chamber 39 and an under-pressure connection 41 is also provided in the upper vacuum chamber 38 by means of which connections the lower and the upper foils are both pulled or drawn into the hot-sealing molds. To effect an evacuation of the inside of the containerlike segments a nozzle bar 35 (FIG. 1) is used, which nozzle bar is arranged crosswise above the inlet side to the packaging device 37. The lower foil 2 runs below the nozzle bar 35, while the upper foil 19 extends above the nozzle bar and between the nozzle bar and the vacuum chamber 38.

Chain guide parts 13 for the chain 7 are associated with the packaging device 37 and are as stated above, vertically elevatable. For this purpose the chain guide 8 is separated in the region of the packaging device 37 from the chain guide 13, as this is shown in FIG. 1. In addition, the chain guide 13 is divided into two parts. The opposite ends of the chain guides 13 are fastened to stationary joints 14 arranged on opposite ends of the packaging device 37. A U-shaped profile 32, which is connected to a compressed-air cylinder 15, hingedly engages the two mutually adjacent ends 42, 43 of the chain guide parts 13. The compressed-air cylinder 15 is fluid pressure loaded on one side of a piston and is moved back to its initial position by a spring 33, one end of which engages the U-shaped profile 32 and the other end engages a fixed surface.

Figure 4:
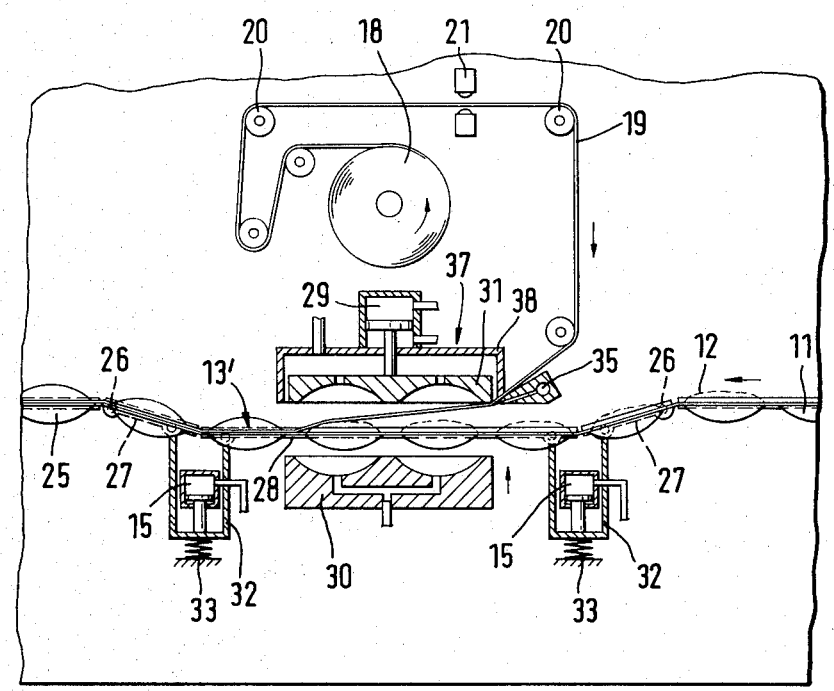
FIG. 4 is a cross-sectional view of a further exemplary embodiment according to the invention with raisable and lowerable chain guide mechanisms which are divided into three sections.

In the exemplary embodiment according to FIG. 4, the chain guide 13' is divided in the region of the packaging device 37 into two sections 27 and a central section 28. The two end sections 27 are constructed alike and are connected to stationarily arranged hinged joints 26 located on opposite ends of the packaging device 37. A U-shaped profile 32 engages each of the joints, which profile, just like in the preceeding exemplary embodiment, is connected to a compressed-air cylinder 15. A horizontally level lowering of the central section 28 in the region of the packaging device 37 is obtained through this triple division of the chain guide 13'.

OPERATION

The device operates as follows: First the lower foil 2 is formed into containerlike segments 11 in the deep-drawing station 36 and subsequently the goods or material 12 to be packaged is inserted into the containerlike segments in the region between the deep-drawing station 36 and the packaging device 37. A transport of the containerlike segments occurs step-by-step. In the present exemplary embodiment, the belt is moved forward in steps equal to the width of two containerlike segments. During each cyclic movement of the foils, the lower vacuum chamber half 16 is opened and with the help of the compressed-air cylinder or cylinders 15, the chain guide parts 13 or 27, 28 are lowered. Through this construction, the upper edge of the lower foil is sufficiently spaced from the nozzle bar 35 and the stationary upper evacuating chamber 38, so that the material 12, including the material that projects above the upper edge of the lower foil, can be moved into the packaging device 37 without contact with these components. The lower vacuum chamber half 16 is thereafter again lifted, as this is illustrated in FIG. 3. The upper hot-sealing mold part is hereby in a raised position. The upper and lower vacuum chamber halves are then evacuated and at the same time or subsequently, the inside of the package is evacuated through the nozzle bar 35. The upper hot-sealing mold part is lowered with the help of the cylinder 29, which causes the lower and the upper foil to be welded to one another. The lower vacuum chamber half 16 is thereafter lowered and, at the same time, the chain guides 13 are also lowered, so that now a cyclic or stepped forward movement of the lower and upper foils can be carried out. The heating plate 4, which serves to heat up the lower foil, has the task that through a suitable expansion of the lower and upper foils, the foils can be adjusted so that during the sealing operation, these can be welded together in the predetermined manner lying one above the other.

The adjustment of the lower and upper foil with the help of the pressure-mark control heads 5,21 can be done in the simplest manner by first separately adjusting the upper foil. This can be done by adjusting the forward movement and by moving the pressure-mark control head 21 into or opposite to the transport direction of the foil. The correct adjustment of the upper foil is controlled in connection with its position in the packaging device. Subsequently occurs the adjustment of the lower foil. Same is adjusted corresponding with the help of the pressure-mark control head 5, wherein at the same time for compensating the different expansion of the foil same can be compensated with the help of the heating mechanism 4.

Instead of the nozzle bar which is described in the exemplary embodiments, the evacuation of the inside of the packages can also be done by making the width of the upper foil for a certain amount more narrow than the lower foil, so that the package can be evacuated through the space which is created between the two foils. The evacuation then takes place through the gap, which exists between the housing of the evacuating chamber and the sealing station 17.

Figure 5:
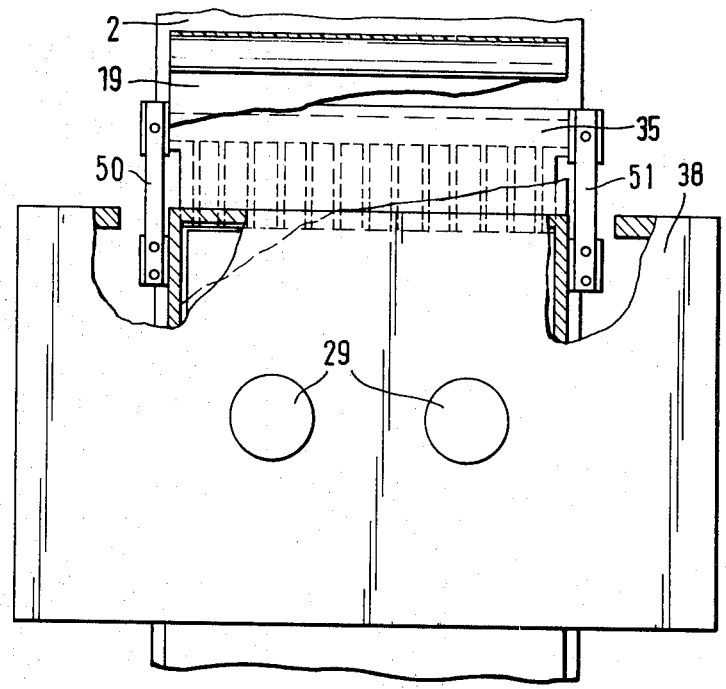
FIG. 5 is a top view of the packaging device illustrating the resilient support for the nozzle bar.

The springy fastening of the nozzle bar on the evacuating chamber 38 is illustrated schematically in FIG. 5. This fastening occurs through two leaf springs 50, 51, which are secured on the sides of the evacuating chamber 38. Due to the weight of the nozzle bar 35 and the design of the leaf springs 50, 51 the nozzle bar 35 is lowered downwardly during the downward travel of the evacuating chamber 39, so that a gap is created for the foil 19 between the nozzle bar 35 and the evacuating chamber 38, so that said foil can be moved on. Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a packaging device for sealingly closing an upper foil and a lower foil comprising a framelike welding device having a separate drive for welding together a lower foil and an upper foil, at least said lower foil being formed into containerlike segments and being engaged to a chain along the lateral edges thereof, said chain effecting a movement of said lower foil through said packaging device, said packaging device further having an evacuating chamber which is formed of two boxlike halves, the improvement comprising wherein one of said two boxlike halves is stationary and the other half is vertically elevatable relative to said upper and lower foils, said stationary half having said welding device mounted thereon, wherein first drive means are provided for initially spacing said other half from said stationary half to facilitate a movement of both foils therebetween, particularly said lower foil with product to be packaged being received in said containerlike segments, wherein said chain is held at least in the region of said packaging device in guides which are vertically elevatable, and wherein second drive means are provided for initially spacing said guides, and thence said lower foil, away from said stationary half and for moving said guides, and thence said lower foil, toward said other half to facilitate the unhindered movement of said product to be packaged between said stationary half and said other half.

2. The packaging device according to claim 1, wherein said guides include plural guide sections, and wherein said second means effectively facilitates said movement of said plural guide sections toward and away from said stationary half.

3. The packaging device according to claim 1 or claim 2, including a lower foil unwinding device and a deep-drawing station for forming said lower foil into containerlike segments, and wherein between said lower foil unwinding device and said deep-drawing station there is arranged a heating device for heating up the lower foil.

4. The packaging device according to claim 1, wherein at least one half of said evacuating chamber has on an inlet side of its edge which rests on the oppositely positioned half a recess, into which recess a nozzle bar is positioned and which is connected to a supply line, said nozzle bar being located between said lower foil and said upper foil and is movable relative to said two halves of said evacuating chamber and when said evacuating chamber is open, said nozzle bar is spaced both from said stationary half and said other half.

5. The packaging device according to claim 1, wherein said stationary half includes third means therein for forming said upper foil into containerlike segments.

* * * * *